US006940637B2

(12) United States Patent
Toney (10) Patent No.: US 6,940,637 B2
(45) Date of Patent: Sep. 6, 2005

(54) MULTI-BARRIER PHOTONIC HETEROSTRUCTURES

(75) Inventor: James E. Toney, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/658,105

(22) Filed: Sep. 9, 2003

(65) Prior Publication Data

US 2004/0140478 A1 Jul. 22, 2004

Related U.S. Application Data

(60) Provisional application No. 60/409,334, filed on Sep. 9, 2002.

(51) Int. Cl.$^7$ .............................. G02F 1/00; G02B 6/22
(52) U.S. Cl. ....................................... 359/321; 385/126
(58) Field of Search ............................... 359/321, 322; 385/130–132, 126; 250/214.1; 372/98, 102; 343/909

(56) References Cited

U.S. PATENT DOCUMENTS

| | | | |
|---|---|---|---|
| 5,335,240 A | 8/1994 | Ho et al. ...................... 372/39 |
| 5,406,573 A | 4/1995 | Ozbay et al. .................. 372/43 |
| 5,440,421 A | 8/1995 | Fan et al. ..................... 359/245 |
| 5,600,483 A | 2/1997 | Fan et al. ..................... 359/245 |
| 5,740,287 A | 4/1998 | Scalora et al. ................. 385/6 |
| 5,748,057 A | 5/1998 | De Los Santos ............ 333/134 |

(Continued)

FOREIGN PATENT DOCUMENTS

| | | |
|---|---|---|
| WO | WO 98/53350 A | 11/1998 |
| WO | 0 953 853 A | 11/1999 |
| WO | WO 01 77726 A | 10/2001 |
| WO | WO 02/44672 A2 | 6/2002 |

OTHER PUBLICATIONS

Sato et al.; 3–D Photonic–Crystal Heterostructures: Fabrication and In–Line Resonator; IEEE Photonics Technology Letters; Jun. 2003; pp. 816–818; vol. 15, No. 6.
John et al.; Photonic Band Gap Materials: A Semiconductor for Light; pp. 1–23.
Fan et al.; Channel Drop Filters in Photonic Crystals; Optics Express; Jul. 1998; pp. 4–11; vol. 3, No. 1.
Gadot F. et al.; Transmission Resonances in Ultra–Wideband Composite Metallic Photonic Crystals; Electronics Letters, IEE Steveage; GB; vol. 35, No. 6; Mar. 18, 1999; pps. 478–480.

Primary Examiner—Georgia Epps
Assistant Examiner—William Choi
(74) Attorney, Agent, or Firm—Dinsmore & Shohl LLP (57) ABSTRACT

An optical heterostructure is provided comprising a matrix and first and second bandgap regions defined in the matrix. The second bandgap region is characterized by a periodic arrangement of inclusions in the matrix. The inclusions have an index of refraction substantially different than the index of refraction of the matrix. The first and second bandgap regions alternate in succession along a primary dimension of optical propagation of the heterostructure device to define a succession including at least one bandgap region of the first type interposed between a pair of bandgap regions of the second type. The first bandgap region defines a first optical bandgap of the optical heterostructure. The second bandgap region defines a second optical bandgap of the optical heterostructure. The spacing between the band gap regions of the second type created by the interposition of the first band gap region there between is such that the first optical bandgap is centered at a different wavelength than the second optical bandgap and such that a transmission bandwidth is defined between the first and second optical bandgaps. Accordingly, the first and second bandgap regions each function as optical barriers and the device as a whole comprises a multi-barrier photonic heterostructure.

40 Claims, 4 Drawing Sheets

U.S. PATENT DOCUMENTS

| | | | |
|---|---|---|---|
| 5,784,400 A | 7/1998 | Joannopoulos et al. | 372/96 |
| 5,973,823 A | 10/1999 | Koops et al. | 359/322 |
| 5,998,298 A | 12/1999 | Fleming et al. | 438/692 |
| 6,042,998 A | 3/2000 | Brueck et al. | 430/316 |
| 6,058,127 A | 5/2000 | Joannopoulos et al. | 372/92 |
| 6,075,640 A | 6/2000 | Nelson | 359/239 |
| 6,101,300 A | 8/2000 | Fan et al. | 385/27 |
| 6,134,043 A | 10/2000 | Johnson et al. | 359/237 |
| 6,388,795 B1 | 5/2002 | Fleming et al. | 359/240 |
| 6,392,787 B1 | 5/2002 | Cirelli et al. | 359/321 |
| 6,396,617 B1 * | 5/2002 | Scalora | 359/248 |
| 6,448,997 B1 | 9/2002 | Koide | 347/250 |
| 6,560,006 B2 | 5/2003 | Sigalas et al. | 359/321 |
| 6,858,864 B2 * | 2/2005 | Atanackovic et al. | 257/17 |
| 2001/0019565 A1 | 9/2001 | Iwasaki et al. | 372/39 |
| 2002/0009277 A1 | 1/2002 | Noda et al. | 385/130 |
| 2003/0031438 A1 | 2/2003 | Kambe et al. | 385/122 |
| 2003/0043870 A1 | 3/2003 | Shchukin et al. | 372/45 |
| 2003/0056546 A1 * | 3/2003 | Claus et al. | 65/386 |

* cited by examiner

MULTI-BARRIER PHOTONIC HETEROSTRUCTURES

CROSS-REFERENCE TO RELATED APPLICATIONS

This application claims the benefit of U.S. Provisional Application Ser. No. 60/409,334, filed Sep. 9, 2002. This application is related to U.S. patent application Ser. No. 10/685,122, filed Sep. 9, 2003.

BACKGROUND OF THE INVENTION

The present invention relates generally to the propagation, direction, conditioning and other control of optical signals in optical devices and, more particularly, to the use of photonic bandgap structures in optical devices. Modem telecommunications networks, for example, utilize a variety of optical components to affect control of optical signals and the present invention presents a scheme for enhancing the performance of such networks by utilizing photonic bandgap structures in the networks. It is noted that reference herein to "bandgap" structures or devices incorporates not only bandgap structures where transmission of a selected wavelength of radiation is inhibited in all directions, but also structures or devices that are spatially selective with reference to the propagation of a particular wavelength of radiation, i.e., structures where transmission of a selected wavelength of radiation is inhibited in one direction, or less than all directions.

For the purposes of defining and describing the present invention, it is noted that the use of the term "optical" throughout the present description and claims is not intended to define a limit to any particular wavelength or portion of the electromagnetic spectrum. Rather, the term "optical" is defined herein to cover any wavelength of electromagnetic radiation capable of propagating in a waveguide. For example, optical signals in the visible and infrared portions of the electromagnetic spectrum are both capable of propagating in an optical waveguide. A waveguide may comprise any suitable signal propagating structure. Examples of waveguides include, but are not limited to, optical fibers, slab waveguides, ridge waveguides, and thin-films used, for example, in integrated optical circuits. Complex optical devices such as optical networks, isolators, circulators, multiplexers, demultiplexers, wavelength lockers, modulators, variable attenuators, dispersion compensators, power monitors, lasers, amplifiers, detectors, routers, switches, interleavers, and combinations thereof, can be configured to incorporate optical waveguides.

BRIEF SUMMARY OF THE INVENTION

In accordance with one embodiment of the present invention, an optical heterostructure is provided comprising a matrix and first and second bandgap regions defined in the matrix. The second bandgap region is characterized by a periodic arrangement of inclusions in the matrix. The inclusions have an index of refraction substantially different than the index of refraction of the matrix. The first and second bandgap regions alternate in succession along a primary dimension of optical propagation of the heterostructure device to define a succession including at least one bandgap region of the first type interposed between a pair of bandgap regions of the second type. The first bandgap region defines a first optical bandgap of the optical heterostructure. The second bandgap region defines a second optical bandgap of the optical heterostructure. The spacing between the band gap regions of the second type created by the interposition of the first band gap region there between is such that the first optical bandgap is centered at a different wavelength than the second optical bandgap and such that a transmission bandwidth is defined between the first and second optical bandgaps. Accordingly, the first and second bandgap regions each function as optical barriers and the device as a whole comprises a multi-barrier photonic heterostructure.

In accordance with another embodiment of the present invention, an optical heterostructure is provided comprising a matrix and first and second bandgap regions defined in the matrix. The first bandgap region is characterized by a periodic arrangement of first inclusions in the matrix. The periodic arrangement of the first inclusions in the matrix define a first optical bandgap of the optical heterostructure. The second band gap region is characterized by a periodic arrangement of second inclusions in the matrix. The periodic arrangement of the second inclusions in the matrix define a second optical bandgap of the optical heterostructure. The first and second inclusions are composed of a material having an index of refraction substantially different than the index of refraction of the matrix. The first optical bandgap is centered at a different wavelength than the second optical bandgap.

In accordance with another embodiment of the present invention, an optical heterostructure is provided comprising first and second optical bandgap regions. The first bandgap region comprises an optical medium having a relatively high index of refraction and an optical medium having a relatively low index of refraction. The second bandgap region comprises an optical medium having a relatively high index of refraction and an optical medium having a relatively low index of refraction. The high index optical medium and the low index optical medium of the first bandgap region are arranged in a periodic lattice and define a first optical bandgap. The high index optical medium and the low index optical medium of the second bandgap region are arranged in a periodic lattice and define a second optical bandgap. The first bandgap is centered at a shorter wavelength than the second bandgap.

In accordance with yet another embodiment of the present invention, an optical waveguide is provided comprising a core region and a boundary region having substantially different indices of refraction. The core region defines a primary dimension of optical propagation and is bounded by the boundary region at least along the primary dimension of optical propagation. The core region defines a heterostructure region incorporating an optical heterostructure according to the present invention.

In accordance with yet another embodiment of the present invention, an optical device is provided comprising components configured to function as one of an optical isolator, circulator, multiplexer, demultiplexer, wavelength locker, modulator, variable attenuator, dispersion compensator, power monitor, laser, amplifier, detector, router, switch, interleaver, and combinations thereof, wherein the optical device employs at least one optical heterostructure according to the present invention.

In accordance with yet another embodiment of the present invention, a method of fabricating an optical heterostructure is provided comprising: (i) defining a periodic arrangement of first inclusions; (ii) defining a periodic arrangement of second inclusions; and (iii) forming the periodic arrangement of first and second inclusions in a matrix so as to define first and second bandgap regions in the matrix. The first and second inclusions are composed of a material having an index of refraction substantially different than an index of refraction of the matrix. The first and second bandgap regions define first and second optical bandgaps of the optical heterostructure. The first optical bandgap is centered at a different wavelength than the second optical bandgap.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
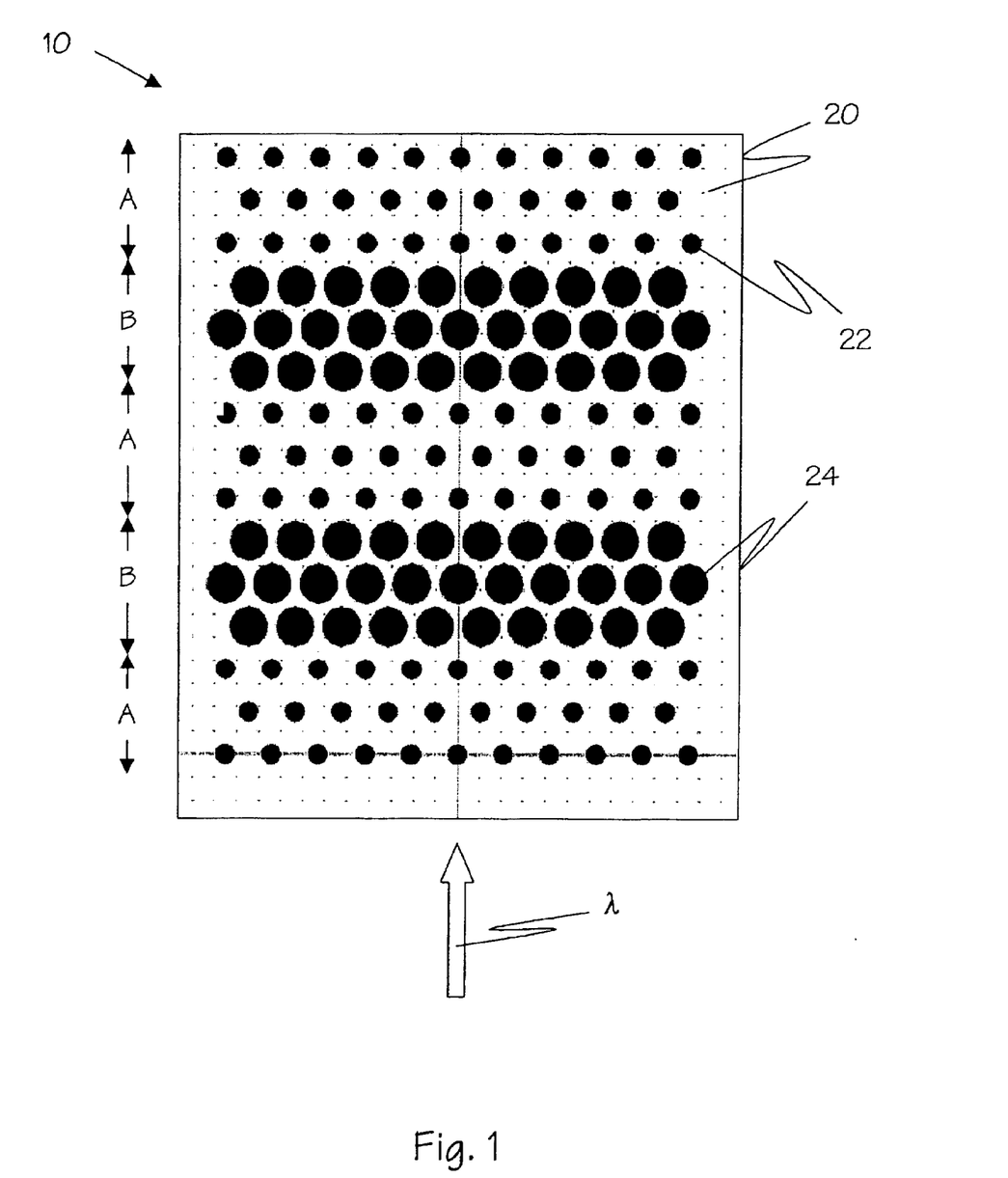
FIG. 1 is an illustration of an optical heterostructure according to one embodiment of the present invention.

Referring to FIG. 1, an optical heterostructure 10 according to the present invention is illustrated. The optical heterostructure comprises a matrix 20 and first and second sets of bandgap regions A, B defined therein. The first set of bandgap regions A is characterized by a periodic arrangement of first inclusions 22 in the matrix 20. The periodic arrangement of the first inclusions 22 in the matrix 20 defines a first optical bandgap of the optical heterostructure 10. The second set of bandgap regions B is characterized by a periodic arrangement of second inclusions 24 in the matrix 20. The periodic arrangement of the second inclusions 24 in the matrix 20 defines a second optical bandgap of the optical heterostructure 10.

For the purposes of defining and describing the present invention, it is noted that the term "heterostructure" is merely intended to denote a structure, object, region, or other type of identifiable matter that includes two or more types of identifiable components. For example, the optical heterostructure 10 illustrated in FIG. 1 comprises at least three different identifiable components—the matrix 20, the first inclusions 22, and the second inclusions 24.

Figure 4:
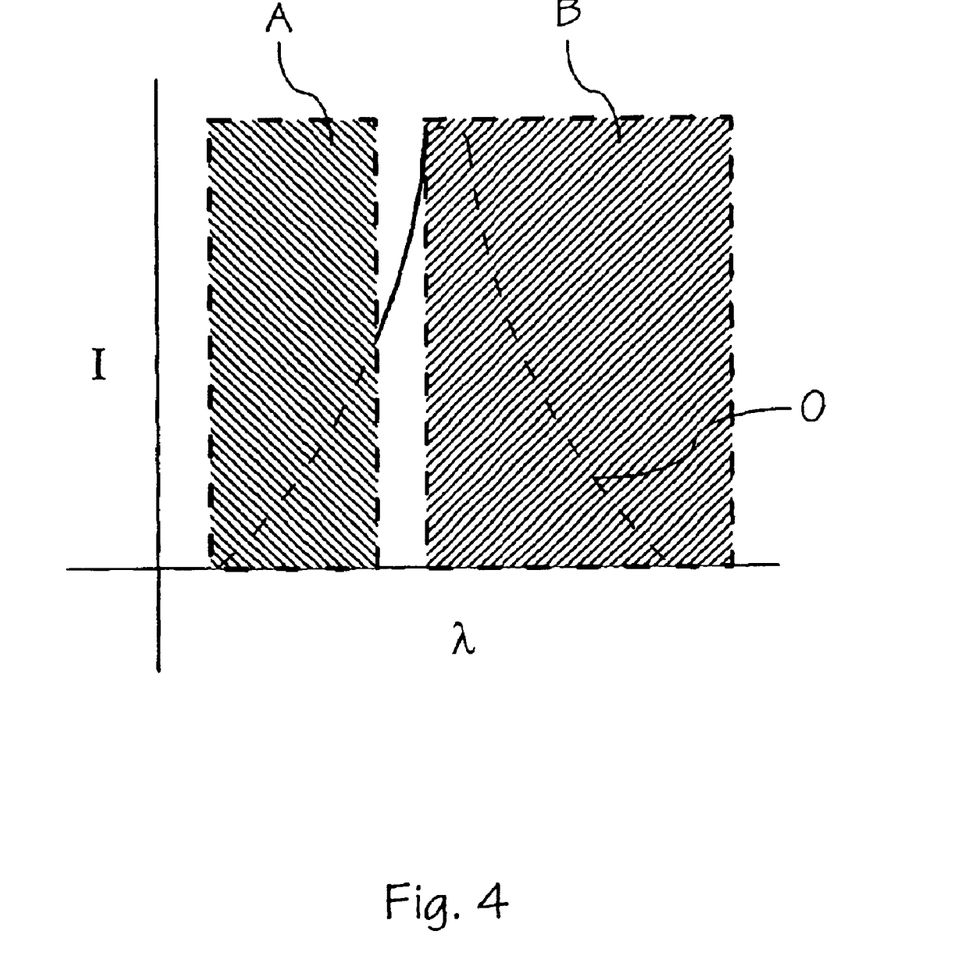
FIG. 4 is a representation of the manner in which a multi-barrier photonic heterostructure device according to the present invention operates to generate a well-defined, narrow bandwidth optical signal from a broadband light source.

The respective characteristics of the optical bandgaps will vary depending upon the requirements of the particular context in which a device according to the present invention is to be utilized. The first optical bandgap is typically centered at a different wavelength than the second optical bandgap and the bandgaps may define different optical widths. For example, and not by way of limitation, referring to FIG. 4, where a narrow band optical signal is to be generated from a broadband or multi-component light source O of a wavelength centered around 1.5 $\mu$m, the second set of bandgap regions B may be characterized by a relatively wide band gap centered near 1.5 $\mu$m and the first set of bandgap regions A may be characterized by a more narrow band gap centered at a shorter wavelength of about 1.45 $\mu$m. Of course, a wide variety of bandgap characteristics will be suitable for various embodiments of the present invention.

Regarding the specific design considerations affecting the band gap characteristics, it is initially noted that the first and second inclusions 22, 24 have an index of refraction substantially different from the index of refraction of the matrix 20. The matrix 20 may have a relatively high index of refraction while the first and second inclusions 22, 24 have a relatively low index of refraction; or, the matrix 20 may have a relatively low index of refraction while the first and second inclusions have a relatively high index of refraction. For the purposes of describing and defining the present invention, it is noted that indices of refraction that are substantially different or substantially high versus low, define values different enough to establish a waveguide structure permitting efficient propagation of an optical signal $\lambda$. For example, in applications where optical heterostructures of the present invention are to be compatible with silica-based waveguides, it is contemplated that suitable indices of refraction of the material forming the first and second inclusions will range from about 1.0 to about 1.5, assuming lower index inclusions in a higher index medium, or from about 1.5 to about 3.5, assuming higher index inclusions in a lower index medium.

Typically, the first and second inclusions 22, 24 are made of the same material and have substantially identical indices of refraction. However, it is contemplated that the first and second inclusions 22, 24 may be formed of different materials and may have different indices of refraction. Suitable materials for the first and second inclusions include, but are not limited to, materials selected from air, an inert gas, silica, a polymer, an aqueous material, and combinations thereof. Similarly, suitable materials for the matrix include, but are not limited to, materials selected from air, an inert gas, silica, a polymer, an aqueous material, and combinations thereof.

The wavelength difference in the first and second optical bandgaps may be attributable to one or more of the following factors: (i) a difference in respective geometries of the first and second inclusions; (ii) a difference in respective sizes of the first and second inclusions (as is the case in FIG. 1); (iii) a difference in the respective periodicities of the first and second inclusions; and (iv) a difference in the respective compositions of the first and second inclusions. In FIG. 1, each of the first inclusions 22 approximate a geometrical shape that is substantially the same as a geometrical shape approximated by each of the second inclusions 24 (i.e., a circle in cross section). However, it is contemplated that, the first inclusions 22 may approximate a geometrical shape that is substantially different than the geometrical shape approximated by the second inclusions 24 (e.g., circles-vs-squares). In any event, it is noted that the first and second inclusions may approximate one or more of a variety of geometrical shapes. It is also noted that differences in sizes may be represented by different cross-sectional areas or volumes. Again, by way of illustration and not limitation, suitable inclusion sizes will range from about 0 $\mu$m to about 0.5 $\mu$m in radial cross section, for visible or near-infrared frequencies. Suitable inclusion periodicities may range from a spacing periodicity of between about 0.3 and about 0.6 $\mu$m, for visible or near-infrared frequencies.

In FIG. 1, the periodicity approximated by the first inclusions 22 is substantially the same as the periodicity approximated by the second inclusions 22. However, it is noted that the periodicity of the first and second inclusions 22, 24 may be varied, particularly where the sizes of the first and second inclusions 22, 24 are the same. A variety of lattice geometries may be utilized according to the present invention to define the respective periodicities of the first and second bandgap regions A, B. For example, suitable lattice geometries include, but are not limited to, square, cubic, hexagonal, tetragonal, etc., and the features within them could be cylinders, squares, rectangles, hexagons, etc.

The present invention may also be conceptualized by describing the first and second bandgap regions A, B as each comprising different respective optical mediums. Specifically, referring to FIG. 1, bandgap region A comprises two optical mediums 20, 22 while bandgap region B comprises two optical mediums 20, 24. One of the optical mediums in each bandgap region has a relatively high index of refraction while the other optical medium in the bandgap region has a relatively low index of refraction. In each of the bandgap regions A, B, the high index optical medium and the low index optical medium are arranged in a periodic lattice and define a unique optical bandgap having a characteristic center wavelength and width.

As is illustrated in FIG. 1, the first and second bandgap regions A, B alternate along a primary dimension of optical propagation of the heterostructure device 10 to define a plurality of first bandgap regions A and a plurality of second bandgap regions B and yield a two-dimensional photonic bandgap structure. Although not illustrated in the Figs., it is contemplated that the first and second bandgap regions A, B may further alternate along a dimension orthogonal to the primary dimension of optical propagation of the heterostructure device to define a three-dimensional photonic bandgap structure. Similarly, although the Figs. illustrate output signals along one primary dimension of the structure, it is contemplated that the device may be configured to generate output signals in a variety of directions, including those parallel to the incident signal, orthogonal to the incident signal, or at any angle relative to the incident signal.

Although the present invention is illustrated with the inclusion of only two different types of bandgap regions A, B, it is noted that the optical heterostructure 10 may further comprise one or more additional bandgap regions. The additional bandgap regions would be characterized by a periodic arrangement of additional inclusions in the matrix 20 to define one or more additional optical bandgaps in the optical heterostructure 10. Each of the additional optical bandgaps may be centered at a different wavelength than the first and second optical bandgaps. As is noted above in the case of the dual bandgap structure, the first, second, and additional bandgap regions may alternate along the primary dimension of optical propagation and the orthogonal dimensions of optical propagation.

The matrix 20 is illustrated in FIG. 1 as defining a substantially homogenous composition throughout the optical heterostructure 10. However, it is noted that the matrix 20 may define a substantially heterogeneous composition throughout the optical heterostructure. For example, the composition of the matrix 20 may vary from bandgap region A, B to the next. It is further noted that a substantially heterogeneous matrix may have an index of refraction that varies spatially throughout the heterostructure 10. Suitable matrix materials include, but are not limited to, materials selected from Si, In, Ga, Al, Sb, As, Ge, P, N, O, $BaTiO_3$, lithium niobate, GaAs, InP, InGaAsP, a semiconductor, a chalcogenide, a polymer, an organic material, and combinations thereof. The matrix 20 may comprise a dopant, e.g., an optically active material like erbium or another rare earth element.

Figure 2:
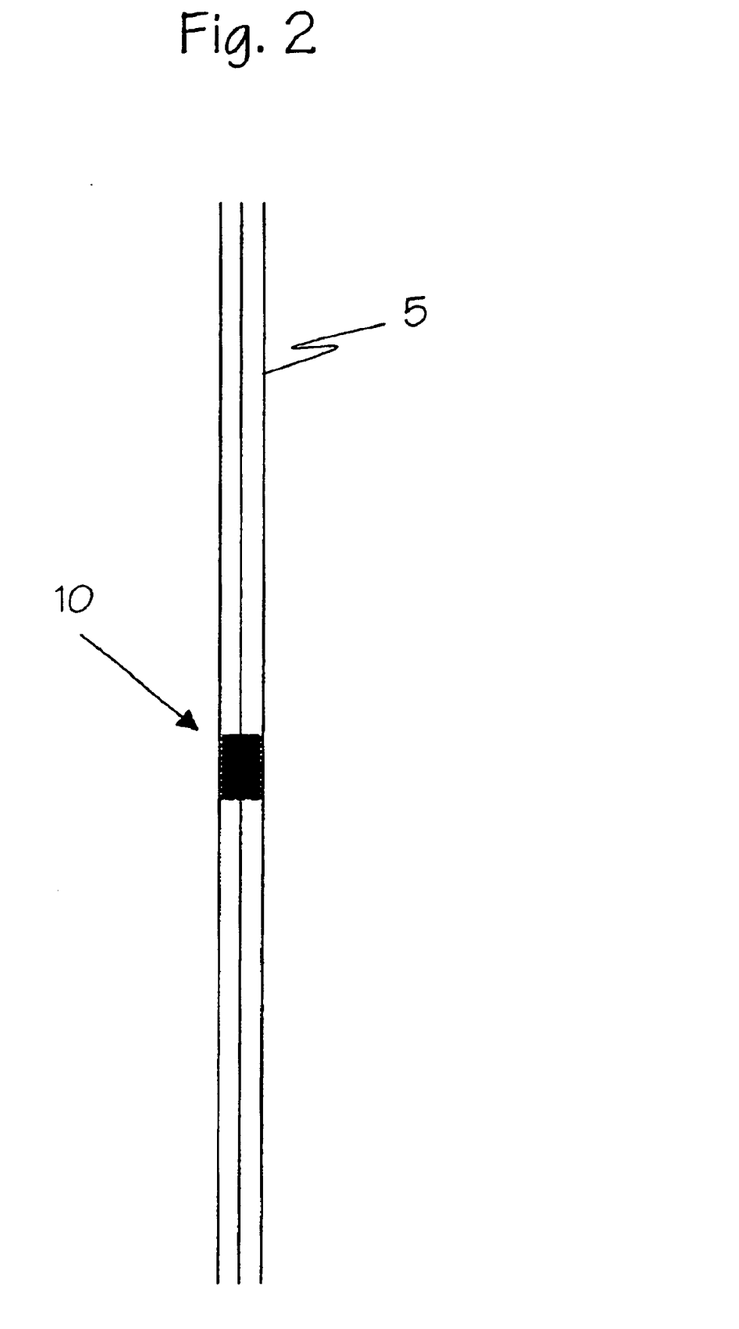
FIG. 2 is an illustration of an optical waveguide incorporating an optical heterostructure according to one embodiment of the present invention.

Referring now to FIG. 2, it is noted that the optical heterostructure 10 of the present invention may be employed in any one of a variety of types of optical waveguides 5. A core region of the optical waveguide 5 defines a primary dimension of optical propagation. The core region is bounded by a boundary region along the primary dimension of optical propagation. The optical heterostructure 10 of the present invention is defined in a heterostructure region of the core.

The core region of the waveguide may have a relatively high index of refraction while the boundary region has a relatively low index of refraction. The boundary region may comprise air, silicon dioxide, a material characterized by an index of refraction approximating that of air or silicon dioxide, or combinations thereof. It is noted that the boundary region may comprise a combination of spatially distinct regions, e.g., air above the core and silicon dioxide on each side of the core. It is noted that, intermediate layers or regions of material may exist between the core and the boundary region without departing from the bounded relationship of the core and the boundary regions.

Figure 3:
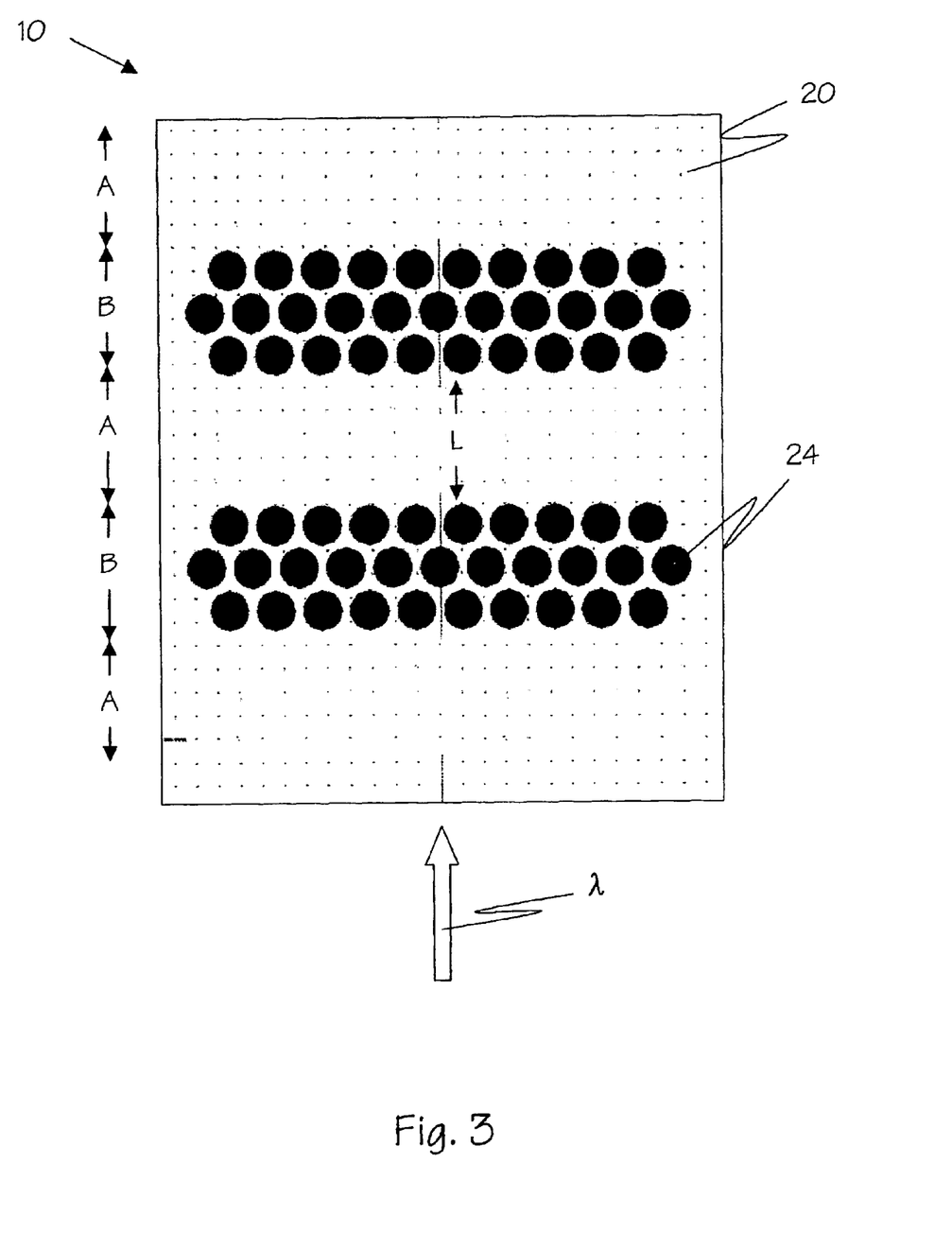
FIG. 3 is an illustration of an optical heterostructure according to another embodiment of the present invention.

Referring now to FIG. 3, it is contemplated that suitable optical bandgap properties may be achieved by eliminating the one of the sets of periodic inclusions from one of the band gap regions A, B, e.g., the first inclusions 22, and establishing an appropriate spacing L between the bandgap regions having the periodic inclusions 24. For example, in the context of a broadband input optical signal centered at a wavelength of about 1.55 $\mu$m, it is contemplated that suitable values for the spacing L between the bandgap regions B will range from about 0.5 $\mu$m to about 5 $\mu$m, and more particularly near about 1.0 $\mu$m.

In the context of optically functional waveguides, the matrix 20, the inclusions 22, 24, or both, may comprise an optically functional material such that it exhibits a substantial change in refractive index in response to a refractive index control parameter. For example, the optically functional material may comprises a non-linear photonic material, an electrooptic material, a thermo-optic material, a semiconductor, or combinations thereof. The control parameter may comprise the intensity of an optical signal propagating along the primary dimension of optical propagation, the intensity and distribution of an electric field across the heterostructure 10, the temperature of the heterostructure 10, the free carrier concentration in the heterostructure 10 or a portion thereof, or combinations thereof.

It follows that the present invention is also drawn to a method of controlling electromagnetic radiation. An input signal of electromagnetic radiation may be directed to an optical heterostructure 10 according to the present invention and one or more electromagnetic output signals may be collected there from—the characteristics of the output signal being a function of the input signal, the properties of the optical heterostructure 10, and/or a control parameter. The control parameter may be one of the varieties identified above and, as such, defines properties of the optical heterostructure 10, including, for example, the refractive index of a material within the heterostructure 10.

Although the optical waveguide 5 and the optical heterostructure 10 of the present invention are illustrated schematically in FIG. 2 as defining a two-dimensional bandgap structure, it is again noted that an optical waveguide 5 incorporating an optical heterostructure 10 according to the present invention may be presented as a three-dimensional bandgap structure. Suitable two and three-dimensional optical devices comprise components configured to function as an optical isolator, circulator, multiplexer, demultiplexer, wavelength locker, modulator, variable attenuator, dispersion compensator, power monitor, laser, amplifier, detector, router, switch, interleaver, or combinations thereof. Nothing in this disclosure is intended to limit the utility of the optical heterostructure of the present invention to a particular type of optical device.

An optical heterostructure 10 according to the present invention may be fabricated to have dimensions compatible with a wide variety of optical waveguides. For example, by way of illustration and not limitation, it is contemplated that The present invention is further directed to a method of fabricating an optical heterostructure 10 according to the present invention. As can be gleaned from the description of the heterostructure 10 of the present invention, according to a suitable fabrication method, a periodic arrangements of first and second inclusions 22, 24 are defined and formed in a matrix 20 to define first and second bandgap regions A, B in the matrix.

The periodic arrangements of the first and second inclusions 22, 24 may be defined, for example, in an image transfer mask through electron beam lithography. The first and second inclusions may be formed by transferring an image from an image transfer mask to the matrix 20 through, for example, reactive ion etching. The periodic arrangements of the first and second inclusions 22, 24 are formed so as to alternate along the primary and/or orthogonal dimensions of optical propagation of the heterostructure device 10 to define a plurality of first bandgap regions A and a plurality of second bandgap regions B in a two or three-dimensional bandgap structure. The method may further comprise doping the matrix 20 or the inclusions 22, 24 with an optically active material.

It is noted that terms like "preferably," "commonly," "typically," and "including" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An optical heterostructure comprising:
   a matrix having an index of refraction;
   a first bandgap region defined in said matrix; and
   a second bandgap region defined in said matrix, wherein
      said first bandgap region is characterized by a periodic arrangement of inclusions in said matrix,
      said inclusions of said first bandgap region have an index of refraction substantially different than said index of refraction of said matrix,
      said second bandgap region is characterized by a periodic arrangement of inclusions in said matrix,
      said inclusions of said second bandgup region have an index of refraction substantially different than said index of refraction of said matrix,
      said first and second bandgap regions alternate in succession along a primary dimension of optical propagation of said heterostructure to define a succession including at least one of said first bandgap regions interposed between a pair of said second bandgap regions,
      said first bandgap region defines a first optical bandgap of said optical heterostructure,
      said second bandgap region defines a second optical bandgap of said optical heterostructure, and
      a spacing between said second bandgap regions created by said interposition of said first bandgap region there between is such that said first optical bandgap is centered at a different wavelength than said second optical bandgap and such that a transmission bandwidth is defined between said first and second optical bandgaps.

2. An optical heterostructure as claimed in claim 1 wherein said first and second inclusions have substantially identical indices of refraction.

3. An optical heterostructure as claimed in claim 1 wherein said matrix has a relatively high index of refraction and said first and second inclusions have a relatively low index of refraction.

4. An optical heterostructure as claimed in claim 1 wherein said matrix has a relatively low index of refraction and said first and second inclusions have a relatively high index of refraction.

5. An optical heterostructure as claimed in claim 1 wherein:
   said optical heterostructure further comprises at least one additional bandgap region defined in said matrix;
   said additional bandgap region is characterized by a periodic arrangement of additional inclusions in said matrix,
   said periodic arrangement of said additional inclusions in said matrix defines at least one additional optical bandgap of said optical heterostructure,
   said additional inclusions have an index of refraction substantially different than said index of refraction of said matrix,
   said additional optical bandgap is centered at a different wavelength than said first and second optical bandgaps.

6. An optical heterostructure as claimed in claim 5 wherein said first, second, and additional bandgap regions alternate along a primary dimension of optical propagation of said heterostructure to define a plurality of first bandgap regions, a plurality of second bandgap regions, and a plurality of additional bandgap regions.

7. An optical heterostructure as claimed in claim 6 wherein said first, second, and additional bandgap regions further alternate along a dimension orthogonal to said primary dimension of optical propagation of said heterostructure.

8. An optical heterostructure as claimed in claim 1 wherein said wavelength difference in said first and second optical bandgaps is attributable to a difference in respective geometries of said first and second inclusions, respective sizes of said first and second inclusions, respective periodicities of said first and second inclusions, respective compositions of said first and second inclusions, or combinations thereof.

9. An optical heterostructure as claimed in claim 1 wherein each of said first inclusions approximate a geometrical shape that is substantially the same as a geometrical shape approximated by each of said second inclusions.

10. An optical heterostructure as claimed in claim 1 wherein each of said first inclusions approximate a geometrical shape that is substantially different than a geometrical shape approximated by each of said second inclusions.

11. An optical heterostructure as claimed in claim 1 wherein each of said first and second inclusions approximate one or more of a variety of geometrical shapes.

12. An optical heterostructure as claimed in claim 1 wherein a cross-sectional area of a geometrical shape approximated by said first inclusions is substantially different than a cross-sectional area of a geometrical shape approximated by said second inclusions.

13. An optical heterostructure as claimed in claim 1 wherein said geometrical shape approximated by said first inclusions is substantially the same as said geometrical shape approximated by each of said second inclusions.

14. An optical heterostructure as claimed in claim 1 wherein a volume of a geometrical shape approximated by said first inclusions is substantially different than a volume of a geometrical shape approximated by said second inclusions.

15. An optical heterostructure as claimed in claim 14 wherein said geometrical shape approximated by said first inclusions is substantially the same as said geometrical shape approximated by each of said second inclusions.

16. An optical heterostructure as claimed in claim 1 wherein a periodicity approximated by said first inclusions is substantially different than a periodicity approximated by said second inclusions.

17. An optical heterostructure as claimed in claim 16 wherein said geometrical shape approximated by said first inclusions is substantially the same as said geometrical shape approximated by each of said second inclusions.

18. An optical heterostructure as claimed in claim 1 wherein said matrix defines a substantially homogenous composition throughout said optical heterostructure.

19. An optical heterostructure as claimed in claim 1 wherein said matrix has a substantially heterogeneous composition throughout said optical heterostructure.

20. An optical heterostructure as claimed in claim 19 wherein said substantially heterogeneous composition has a spatially variant index of refraction.

21. An optical heterostructure as claimed in claim 19 wherein said substantially heterogeneous composition defines a spatially variant composition.

22. An optical heterostructure as claimed in claim 1 wherein said matrix comprises a material selected from Si, In, Ga, Al, Sb, As, Ge, P, N, O, $BaTiO_3$, lithium niobate, GaAs, InP, InGaAsP, a semiconductor, a chalcogenide, a polymer, an organic material, air, or combinations thereof.

23. An optical heterostructure as claimed in claim 1 wherein said matrix comprises a dopant.

24. An optical heterostructure as claimed in claim 23 wherein said dopant comprises an optically active material.

25. An optical heterostructure as claimed in claim 23 wherein said dopant comprises a rare earth element.

26. An optical heterostructure as claimed in claim 23 wherein said dopant comprises erbium.

27. An optical heterostructure as claimed in claim 1 wherein said first and second inclusions comprise a material selected from air, an inert gas, silica, a polymer, an aqueous material, or combinations thereof.

28. An optical heterostructure comprising:

a matrix having an index of refraction;

a first bandgap region defined in said matrix; and a second bandgap region defined in said matrix, wherein
said first and second bandgap regions alternate in succession along a primary dimension of optical propagation of said heterostructure device to define a plurality of first bandgap regions and a plurality of second bandgap regions,
said first bandgap region is characterized by a periodic arrangement of first inclusions in said matrix,
said periodic arrangement of said first inclusions in said matrix defines a first optical bandgap of said optical heterostructure,
said second bandgap region is characterized by a periodic arrangement of second inclusions in said matrix,
said periodic arrangement of said second inclusions in said matrix defines a second optical bandgap of said optical heterostructure,
said first and second inclusions have an index of refraction substantially different than said index of refraction of said matrix,
said first optical bandgap is centered at a different wavelength than said second optical bandgap, and
a transmission bandwidth is defined between said first and second optical bandgaps.

29. An optical waveguide comprising a core region and a boundary region having substantially different indices of refraction, wherein:

said core region defines a primary dimension of optical propagation and is bounded by said boundary region at least along said primary dimension of optical propagation; and said core region defines a heterostructure region comprising
a matrix having an index of refraction,
a first bandgap region defined in said matrix, and
a second bandgap region defined in said matrix, wherein
said first bandgap region is characterized by a periodic arrangement of first inclusions in said matrix,
said periodic arrangement of said first inclusions in said matrix defines a first optical bandgap of said optical heterostructure,
said second bandgap region is characterized by a periodic arrangement of second inclusions in said matrix,
said first and second inclusions have an index of refraction substantially different than said index of refraction of said matrix,
said periodic arrangement of said second inclusions in said matrix defines a second optical bandgap of said optical heterostructure,
said first optical bandgap is centered at a different wavelength than said second optical bandgap, and
a transmission bandwidth is defined between said first and second optical bandgaps.

30. An optical waveguide as claimed in claim 29 wherein said core region has a relatively high index of refraction and said boundary region has a relatively low index of refraction.

31. An optical waveguide as claimed in claim 29 wherein said core region has a relatively low index of refraction and said boundary region has a relatively high index of refraction.

32. An optical waveguide as claimed in claim 29 wherein said matrix comprises an optically functional material and exhibits a substantial change in refractive index in response to a refractive index control parameter.

33. An optical waveguide as claimed in claim 32 wherein said optically functional material comprises a non-linear photonic material, an electrooptic material, a thermo-optic material, a semiconductor, or combinations thereof.

34. An optical waveguide as claimed in claim 32 wherein said control parameter comprises intensity of an optical signal propagating along said primary dimension of optical propagation, intensity and distribution of an electric field across said matrix, a temperature of said heterostructure, a free carrier concentration in said matrix, or combinations thereof.

35. An optical waveguide as claimed in claim 29 wherein said first and second inclusions comprise an optically functional material and exhibit a substantial change in refractive index in response to a refractive index control parameter.

36. An optical waveguide as claimed in claim 29 wherein said matrix and said first and second inclusions comprise an optically functional material and exhibit a substantial change in refractive index in response to a refractive index control parameter.

37. An optical waveguide as claimed in claim 29 wherein said boundary region comprises air, silicon dioxide, a material characterized by an index of refraction approximating that of air or silicon dioxide, or combinations thereof.

38. An optical waveguide as claimed in claim 29 wherein said boundary region comprises a combination of spatially distinct regions.

39. An optical waveguide as claimed in claim 29 wherein said boundary region comprises a region of air and a spatially distinct region of silicon dioxide.

40. An optical device comprising at least one optical heterostructure, said optical heterostructure comprising:
a matrix having an index of refraction;
a first bandgap region defined in said matrix; and
a second bandgap region defined in said matrix, wherein
said first bandgap region is characterized by a periodic arrangement of inclusions in said matrix,
said inclusions of said first bandgap region have an index of refraction substantially different than said index of refraction of said matrix,
said second bandgap region is characterized by a periodic arrangement of inclusions in said matrix,
said inclusions of said second bandgup region have an index of refraction substantially different than said index of refraction of said matrix,
said first and second bandgap regions alternate in succession along a primary dimension of optical propagation of said heterostructure to define a succession including at least one of said first bandgap regions interposed between a pair of said second bandgap regions,
said first bandgap region defines a first optical bandgap of said optical heterostructure,
said second bandgap region defines a second optical bandgap of said optical heterostructure, and
a spacing between said second bandgap regions created by said interposition of said first bandgap region there between is such that said first optical bandgap is centered at a different wavelength than said second optical bandgap and such that a transmission bandwidth is defined between said first and second optical bandgaps.

* * * * *

UNITED STATES PATENT AND TRADEMARK OFFICE
CERTIFICATE OF CORRECTION

PATENT NO. : 6,940,637 B2 Page 1 of 1
APPLICATION NO. : 10/658105
DATED : September 6, 2005
INVENTOR(S) : James E. Toney It is certified that error appears in the above-identified patent and that said Letters Patent is hereby corrected as shown below:

Col. 1, Line 9, "10/685,122" should read --10/658,122
Col. 1, Line 16, "Modem" should read --Modern--
Col. 8, Line 1, "bandgup" should read --bandgap--

Signed and Sealed this

First Day of August, 2006

JON W. DUDAS
*Director of the United States Patent and Trademark Office*